United States Patent [19]

Kallenberger

[11] Patent Number: 5,289,733
[45] Date of Patent: Mar. 1, 1994

[54] APPARATUS FOR MOUNTING GEAR SEGMENTS

[75] Inventor: Harvey J. Kallenberger, Wind Lake, Wis.

[73] Assignee: Harnischfeger Corporation, Brookfield, Wis.

[21] Appl. No.: 985,264

[22] Filed: Dec. 3, 1992

[51] Int. Cl.⁵ ............................................. F16H 55/12
[52] U.S. Cl. ...................................... 74/447; 74/448; 403/336
[58] Field of Search .................. 74/447, 448; 403/336; 474/902

[56] References Cited

U.S. PATENT DOCUMENTS

| 379,022 | 3/1888 | Morgan | 74/447 X |
| 1,206,172 | 11/1916 | Thomas | 74/448 |
| 3,175,419 | 3/1965 | Horton | 74/448 |

FOREIGN PATENT DOCUMENTS

| 175363 | 9/1906 | United Kingdom | 74/447 |
| 493711 | 8/1919 | United Kingdom | 74/448 |

Primary Examiner—Allan D. Herrmann
Attorney, Agent, or Firm—Jansson & Shupe, Ltd.

[57] ABSTRACT

The invention is an improvement in a gear assembly having a gear segment attached to a spider. The improvement comprises a pair of spaced spider webs and a segment-attached mounting member received between the webs. The mounting member has a pair of spaced plates, one plate against each web. Each of a group of tube-like generally cylindrical segment coupling members extends between a particular web and its adjacent plate while each of another group of coupling members extends between the other web and its adjacent plate. The coupling members of a group are in opposed relationship to corresponding coupling members of another group. A bolt-like retaining member extends through each pair of opposed coupling members (with clearance therebetween) and prevents such members "working" out of position.

7 Claims, 8 Drawing Sheets

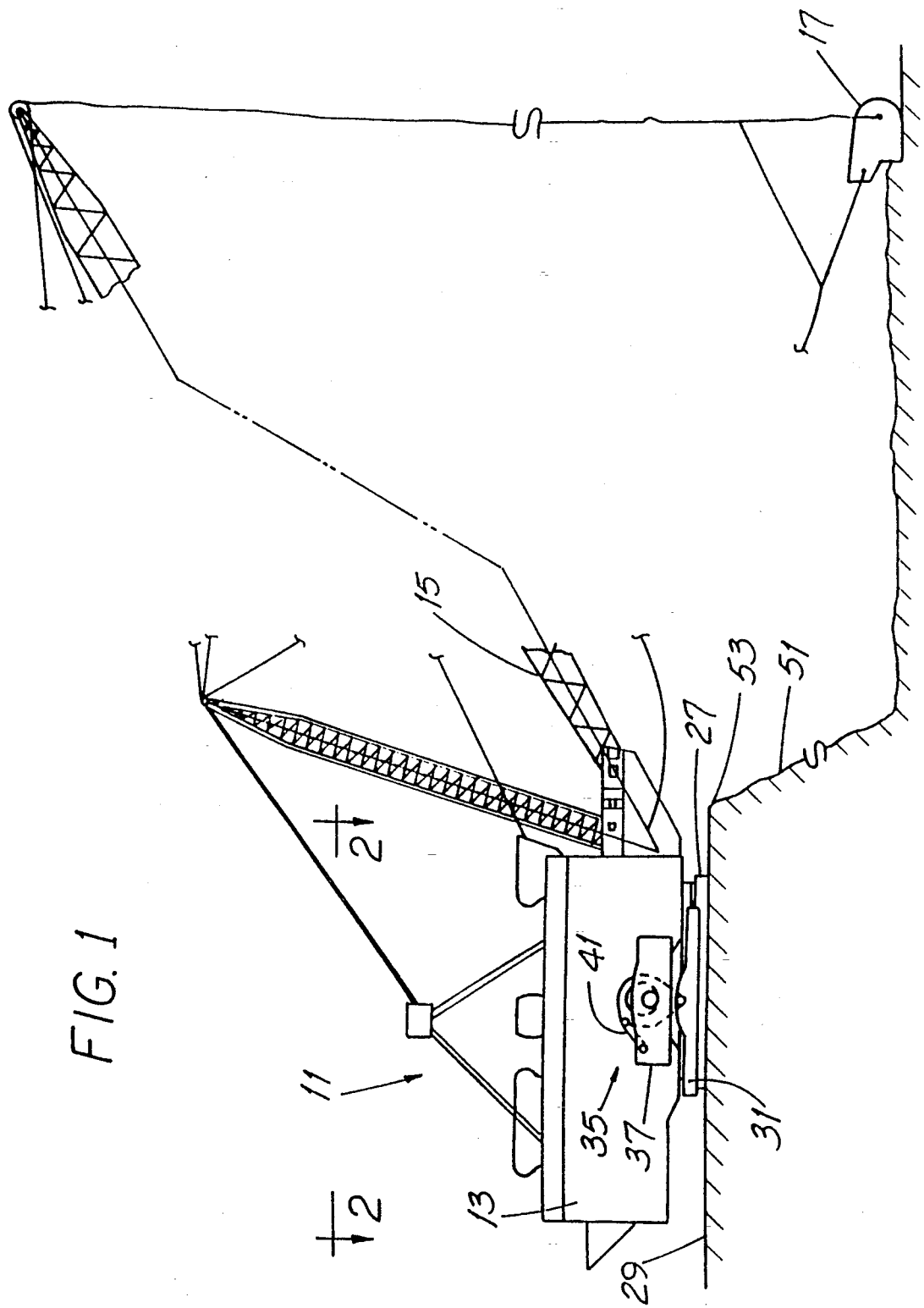

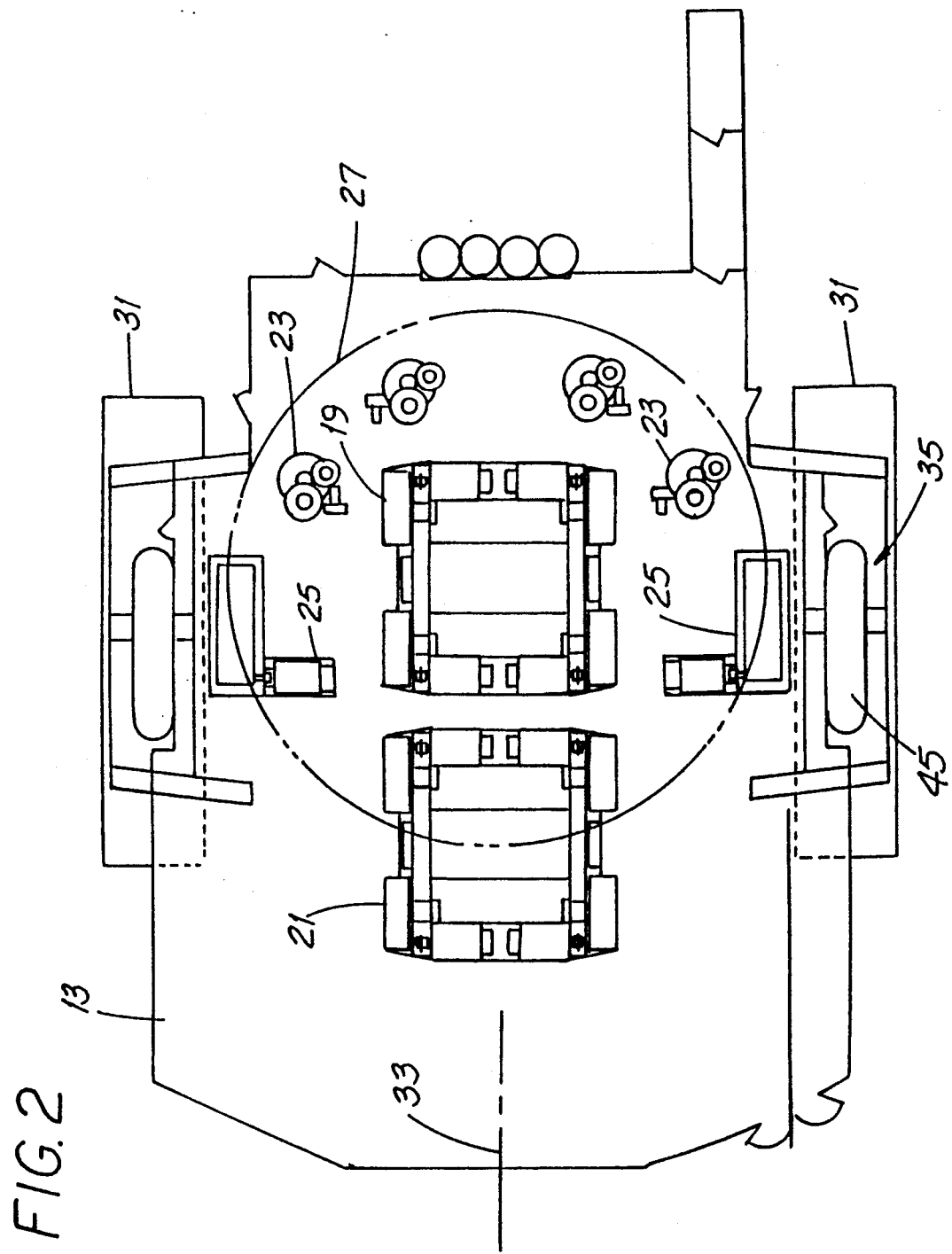

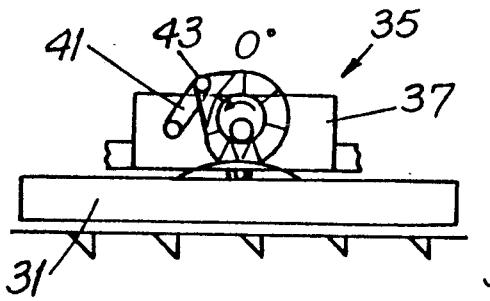
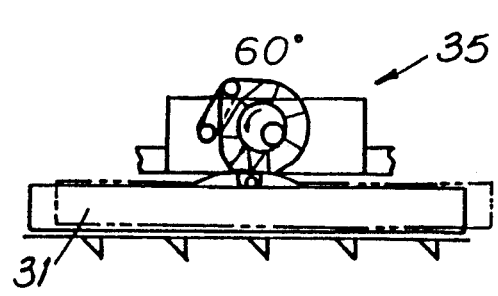
FIG.3A  FIG.3B
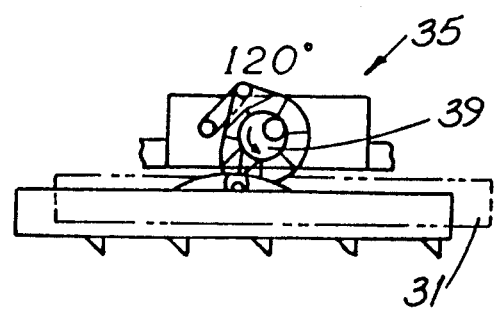
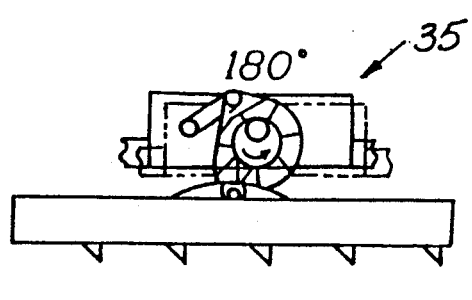
FIG.3C  FIG.3D
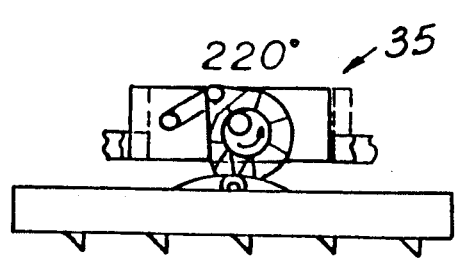
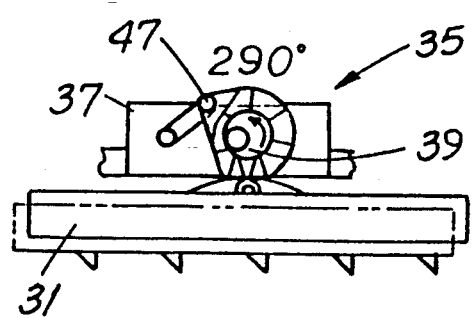
FIG.3E  FIG.3F
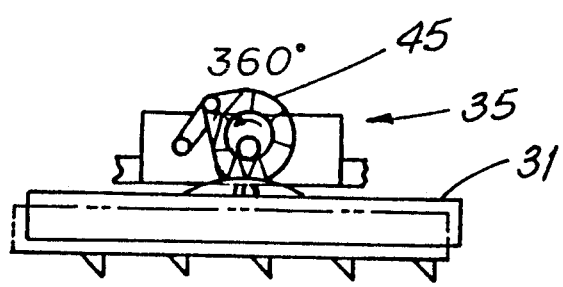
FIG.3G

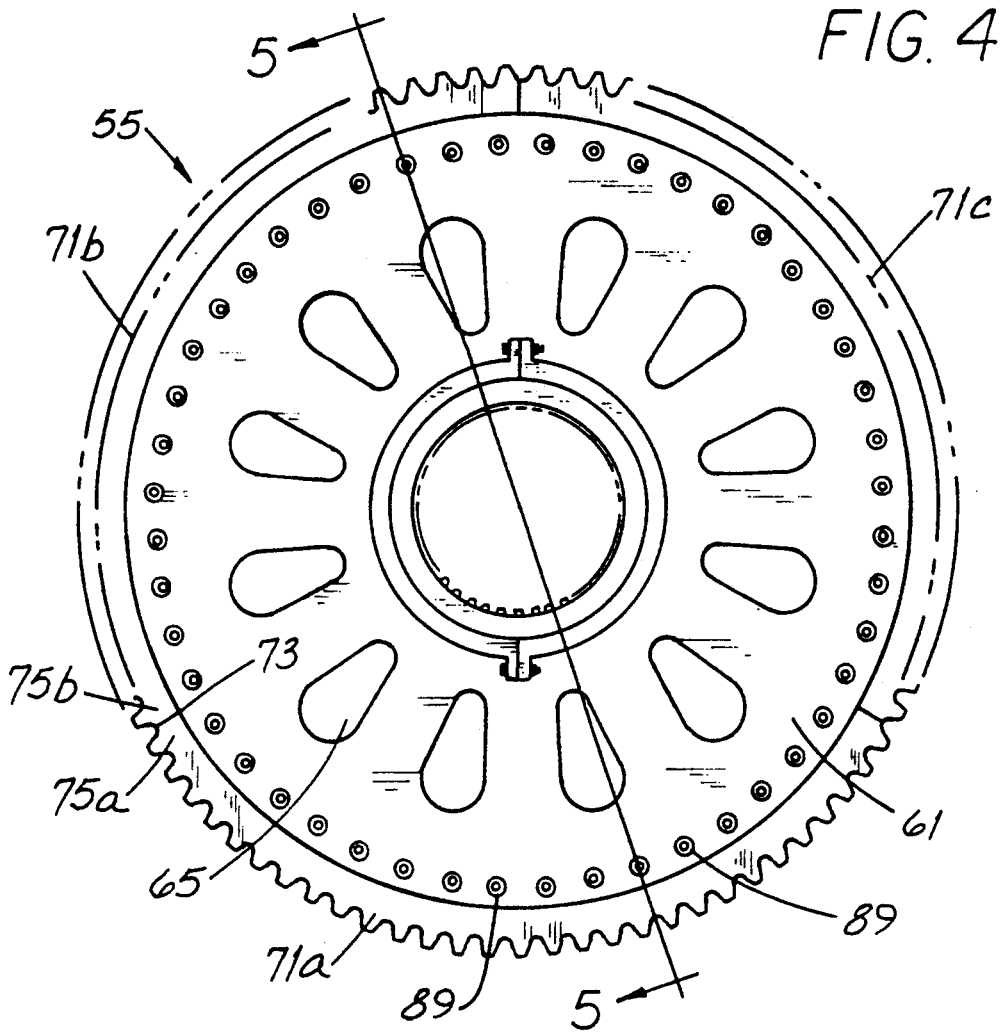
FIG. 4
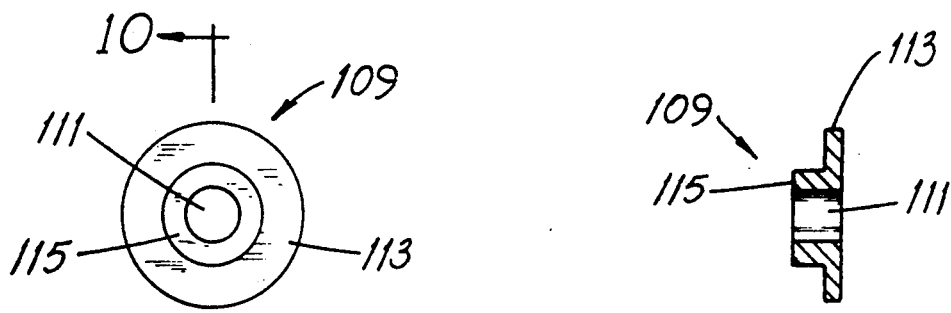
FIG. 9
FIG. 10

APPARATUS FOR MOUNTING GEAR SEGMENTS

FIELD OF THE INVENTION

This invention is related generally to powered machinery and, more particularly, to machinery transmitting power from a prime mover through a geared mechanical drive train.

BACKGROUND OF THE INVENTION

Machinery powered by electric motors or internal combustion engines (typically referred to as "prime movers") often use gears, shafts and the like to form a drive train providing power used to perform an end-use function. Automobiles, metal cutting and shaping machines, toggle-type presses and construction and earth-moving machines are but a few examples of such machinery.

As more specific examples, such machinery drive trains uses gears and shafts in speed reducers and right angle drives to reduce speed (from that of the motor or engine output shaft) and increase torque and/or to change the direction of power flow. Shafts interconnect "stages" of gearing or connect a final gearing stage to an output device such as automobile wheels, press head or, in the case of an earth-moving machine known as a walking dragline, to a "walk leg" drive.

In such machines, the drive train components (gears, shafts and the like) may range in size from a few pounds to several thousand pounds. Clearly, small drive train components can be more readily serviced. Equally clear is the fact that by their nature, very large drive train components (gears, shafts and the like) are usually attached together by correspondingly large devices which are very difficult to work with, at least because of their weight and size. Nowhere is the difficulty of facile repair more apparent than in large mobile machines such as earth-moving and earth-excavating machinery.

Such machinery is available in a wide variety of types ranging from the familiar rubber-tire mounted and crawler-mounted to the less-common dragline. A dragline is often used for removing top soil and "overburden" to expose a valuable mineral, e.g., coal, beneath but near the earth's surface.

Draglines are equipped with an angularly-extending boom from which is suspended a "bucket" having an open mouth and digging teeth, both toward the main portion of the machine. Overburden is removed by placing the bucket on the ground at a point distant from the machine and pulling it toward the machine, filling the bucket in the process. Once filled, the machine pivots about a central axis and the bucket emptied at a spoil pile somewhat away from the area being excavated.

Smaller draglines are crawler mounted much like a military tank and capable of movement in the same way albeit at much slower speeds. However, as draglines (and their digging buckets) increased in size, crawler mounting was found to be impractical and in the early 1900's, the "walking" dragline was developed. The walking dragline is so named because it takes short "steps" and uses a "walk leg" mechanism (which resembles a human leg) to do so. A difference is that in a walking dragline, both legs step simultaneously.

To give some perspective to the following discussion, a large walking dragline—made by Harnischfeger Industries of Milwaukee, Wis., and incorporating the invention—has a main housing portion (including the machinery deck, operator's cab and the like) which is about 105 feet long, about 80 feet wide,, about 40 feet high and weighs about nine million pounds. The boom extends about 300 feet and the capacity of the digging bucket is about 80 cubic yards. The walk legs of such dragline take steps about seven feet in length.

And certain types of machines including walking draglines tend to load (and wear) certain of their drive train components unevenly. For example, the drive train of a toggle press (especially that portion driving the toggle press head mechanism) is most heavily loaded over only that fraction of a revolution relating to the final, piece-forming part of the press stroke. In a walking dragline, the walk leg drive is most heavily loaded only during that part of a revolution during which the dragline is being lifted to take a "step." In the exemplary dragline, gear wear occurs over only about 120° or less of the total 360° gear circumference. While wear over a limited portion of a gear may be one reason to use a segmented gear, it is not the only reason. The gear may be largely inaccessible, necessitating that only the "tooth parts" be removed and then only in segments.

The exemplary dragline takes advantage of a known type of gear configuration called a segmented gear. Such configuration includes a web-like, generally circular "spider" with plural arc-like gear segments mounted around the circumferential perimeter of the spider. Each segment is individually replaceable and the spider and segments may be constructed in "tongue-and-groove" fashion whereby a portion of each segment fits radially inward into a slot-like space in the spider.

The importance of securing each segment to the spider is well recognized. Earlier securing arrangements involved forming holes about the rim of the spider and along the segment and inserting bolts through such holes after they are brought into registry.

And it is important that there be no "play" in the segment-spider fit, especially radially and circumferentially, since most load stresses are radial and/or circumferential. Therefore, such earlier securing arrangements use bolts which were press-fitted into the holes. In general, the term "press-fit" means that the bolts and holes are cooperatively sized so that the bolts must be urged into and through such holes by force.

This arrangement results in several problems. When the bolts are installed, special pressing equipment is often required. And when they need to be removed for segment service (as they will, sooner or later), such bolts must be "jacked" or physically forced out of the holes over the entire bolt length, not just a portion thereof. If the bolts are of any significant size, this may require use of a hydraulic jacking tool—and a lot of patience and stamina. So-called "full-length jacking" can be partly avoided but only by fabricating bolts which are necked down in the middle. Such bolts are invariably "special," expensive to make, not as strong as bolts of uniform diameter and unlikely to be quickly available near a remote repair site.

Another problem is that in larger segmented gears, the bolts are very heavy and difficult to handle. These and other problems presented by earlier securing arrangements, and the deftness with which such problems are addressed and resolved, will be further appreciated after understanding the invention.

OBJECTS OF THE INVENTION

It is an object of the invention to provide an improved apparatus for mounting a gear segment which overcomes some of the problems and shortcomings of the prior art.

Another object of the invention to provide an improved apparatus for mounting a gear segment which can often be installed without special pressing equipment.

Another object of the invention to provide an improved apparatus for mounting a gear segment which is easy to disassemble.

Still another object of the invention to provide an improved apparatus for mounting a gear segment which avoids use of press fitted bolts.

Yet another object of the invention to provide an improved apparatus for mounting a gear segment which uses a plurality of parts, each of which is lighter and easier to handle. How these and other objects are accomplished will become more apparent from the following detailed description and the drawing.

SUMMARY OF THE INVENTION

The invention is described in connection with an improvement in a machine assembly comprising an exemplary gear assembly having a gear segment attached to a spider. More specifically, such invention is an advance in the structure used for segment-spider attachment. However, it will become apparent that the invention is equally useful for other types of machine assemblies such as sheaves and sector gears.

The improvement comprises a pair of spaced, disclike spider plates or webs and a segment-attached mounting member received between the webs with friction fit. A tube-like, generally cylindrical segment coupling member extends between a web and the mounting member and a retaining member (a bolt, pin or the like) extends through a web and the coupling member with at least slight clearance. Unlike earlier segment-web mounting arrangements, such clearance greatly simplifies the matter of bolt removal.

More specifically, the mounting member includes spaced annular plates, a separate one of which is against each plate. Each coupling member extends between a web and a plate. Each web and its "companion" plate have a combined thickness and for reasons relating to ease of removal of the coupling members, it is highly preferred that the coupling member have a length greater than the combined thickness.

Each coupling member extends into a hole in the web and a corresponding hole in the plate which is in registry with that in the web. Such coupling member includes a tapered end facilitating extension into the holes. Of course, it is important that the coupling members do not work their way further through and, possibly, out of the holes. Therefore, a highly preferred coupling member also includes a flanged end which, in the exemplary embodiment, "stops" the member against the web. While the member can extend into a hole, the flanged end prevents such coupling member from extending through a hole.

In the illustrated embodiment, each segment is mounted to the spider by at least one pair of coupling members in axial opposed relationship to one another. In a larger gear assembly like that shown, each segment is attached by several pairs of coupling members, those of each pair being in axial opposed relationship.

And that is not all. The inventive assembly is very easy to take apart. Such feature is important at a field site involving, probably, difficult working conditions.

The machine assembly has an axis of rotation, e.g., that of the shaft on which it is mounted. The coupling member has a generally cylindrical interior surface and in one embodiment, the retaining member is a bolt oriented generally parallel to the axis of rotation and spaced from the interior surface to define an annular space between the surface and the bolt. When the nut holding the bolt is removed, the bolt may be pulled out with ease.

In the preferred arrangement, the annular space represents, of course, a clearance between the bolt and each coupling member surrounding the bolt. An unsupported bolt would likely tend to become offcenter with respect to the central axes of the coupling members secured by it. To help avoid this eventuality, to avoid using a large-diameter washer, as well as to help avoid possible damage to the coupling members by clamping a bolt directly against such members, the bolt is preferably supported generally concentric to the coupling member by at least one collar interposed between the bolt and the coupling member. Most preferably, a collar is at each end of the bolt between the bolt and that coupling member adjacent to such end.

Each collar is hat-shaped in cross section, has a concentric hole through it and has an enlarged shoulder abutting the flanged end of a coupling member. Such collar also has an inward-projecting boss having a diameter selected so that the boss fits easily into the coupling member with slight clearance.

Further details of the invention are set forth in the drawing and the accompanying detailed description.

BRIEF DESCRIPTION OF THE DRAWING

FIG. 1 is a representative side elevation view of a walking dragline.

FIG. 2 is a top plan view, in phantom, of the main housing portion of the dragline of FIG. 1, taken along the viewing plane 2—2 thereof and with parts broken away.

FIGS. 3A-3G show a sequence of operation of one of the walk legs of the dragline of FIG. 1.

FIG. 4 is an elevation view of a gear assembly. Parts are shown in dashed outline.

FIG. 9 is an end elevation view of a collar.

FIG. 10 is a cross-section view of the collar of FIG. 9 taken along the viewing plane 10—10 thereof.

DETAILED DESCRIPTION OF THE PREFERRED EMBODIMENTS

Figure 5:
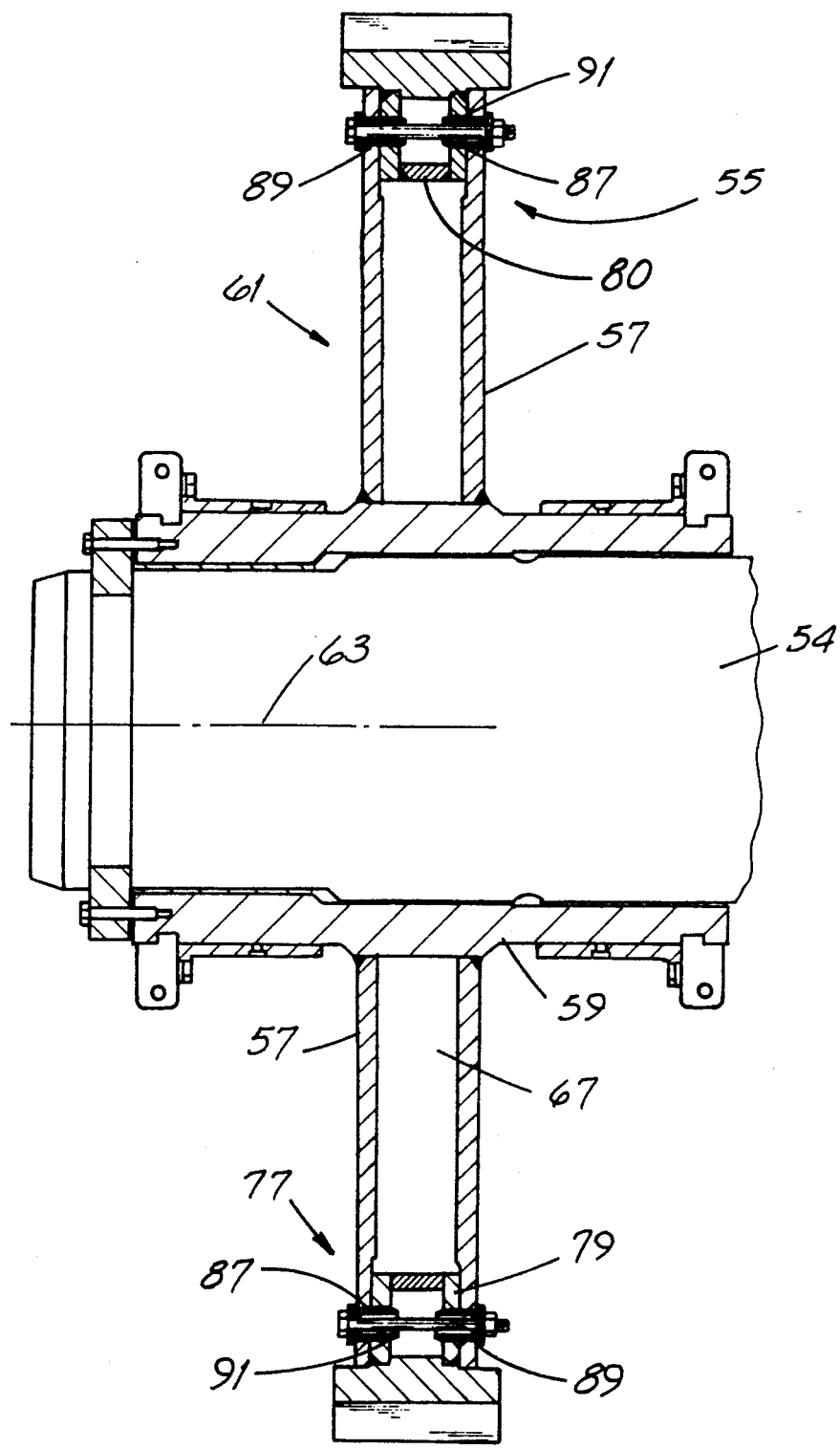
FIG. 5 is an elevation view taken along the section line 5—5 of FIG. 4 and showing the gear assembly of FIG. 4 in conjunction with a shaft driven by the assembly. Parts are in cross-section, other parts are broken away and apertures are omitted.

Before describing the preferred embodiments, it should be appreciated (and persons of ordinary skill will appreciate) that the improved apparatus 10 and method are applicable to stationary mounted "in-factory" machines and to mobile machinery to secure certain machine components to one another. The invention has special appeal in applications where pins "link" two components together in a way that one is relatively movable with respect to the other. The invention clearly offers convenience in machines of moderate size and becomes more compelling as the size of the machine increases. To help "dramatize" and emphasize this fact, the invention is disclosed in connection with one of the largest types of machines in the world, a walking dragline 11.

Referring first to FIGS. 1 and 2, an exemplary walking dragline 11 includes a main housing portion 13 having a boom 15 extending therefrom to support and manipulate a digging bucket 17. Within the housing portion 13 are mounted the bucket hoist, bucket drag and swing systems 19, 21 and 23, respectively. The drive 25 for the "walking" system is also mounted therein. When digging, the dragline 11 sits on and pivots about a generally circular "tub" or platform 27 which rests on the earth's surface 29.

The dragline 11 also includes a pair of pads or "shoes" 31 which, when moved in unison as described below, lift the platform 27 and move the dragline 11 rearward away from the bucket 17. Movement in the exemplary dragline 11 is in "steps" of about seven feet in length and along the long axis 33 of the main housing portion 13.

Referring additionally to FIGS. 3A-3G, a walk-like mechanism 35 typically includes a walk leg housing 37, a driven eccentric 39 and a knee link 41. The knee link 41 has its upper end 43 coupled to the walk leg housing 45 by a pin 47 to permit relative rotation of a few degrees between the link 41 and the housing 45. The lower end 49 of the knee link 41 is similarly coupled to the nearby main housing structure 37. As a rough analogy, the coupling at the upper end 43 of the link 41 is analogous to the human knee and the eccentric 39 is analogous to the human hip joint.

As the eccentric 39 is driven counterclockwise (in the right-side sequence of FIGS. 3A-3G) through one revolution, the shoe 31 is lowered to ground contact and the dragline 11 lifted and moved rearward. The shoe 31 is then raised until the platform 27 again rests on the surface 29.

Since the bucket 17 is drawn toward the dragline 11, removal of overburden 51 progresses toward the dragline 11 until the edge 53 of the pit becomes relatively near to the dragline 11. Therefore, the dragline 11 must occasionally be moved rearward a few feet to expose additional overburden 51 for digging.

Referring to FIGS. 4 and 5, the invention relates to a gear assembly 55 driven by a pinion gear (not shown). The driven gear 55 is concentric with and rotatably powers the walk leg shaft 54 which, in turn, drives the eccentric 39. In a highly preferred embodiment, the gear assembly 55 includes a pair of disc-shaped, spaced webs 57 attached to a quill 59 by welding. The webs 57 (which form the assembly spider 61) are generally flat, mutually parallel and generally normal to the axis of rotation 63. Each web 57 of the spider 61 has a plurality of tear-drop-shaped apertures 65 spaced radially around the axis 63 and equidistant from such axis 63. The apertures 65 in a web 57 are in general registry with those of the other web 57 and permit access to the space 67 between the webs 57.

The assembly 55 also includes a plurality of arc-shaped gear segments 71a, 71b, 71c. In a highly preferred arrangement, there are three such segments 71 extending around the circumference of the spider 61 and each segment 71 spans an arc length of about 120°. FIG. 4 shows the plane 73 at which an end 75a of a segment, e.g., segment 71a abuts an end 75b of an adjacent segment 71b.

Each segment 71 is attached to the spider 61 by a segment mounting member 77, preferably of the type comprising a pair of arc-shaped support plate 79 having a brace 80 extending therebetween. Such plates 79 are attached to the segment body 81 by welding and the outer or first surface 83 of each plate 79 is spaced from the outer surface 83 of the other plate 79 by a dimension substantially equal to the spacing between the inner or second surfaces 85 of the webs 57.

For best rigidity, there is preferably no "play" between the parts making up the assembly 55. Therefore, the spacing between the plate first surfaces 83 and that between the spider second surfaces 85 are preferably cooperatively selected so that there is a friction fit between the spider 61 and the segment mounting member 77. When so fitted, force is required to slide the mounting member 77 along the surfaces 85 and urge a segment 71 away from the spider 61.

Each segment 71 and, more specifically, each segment mounting member 77 has a plurality of radially-spaced attachment holes 87 formed therein at locations generally equidistant from the axis 63. Such holes 87 are spaced equidistant from one another and are in general registry with corresponding holes 89 in the spider 61. After each segment 71 is so positioned on the spider 61, coupling members and retaining members secure each segment 71 to the spider 61 in the manner described below.

Figure 7:
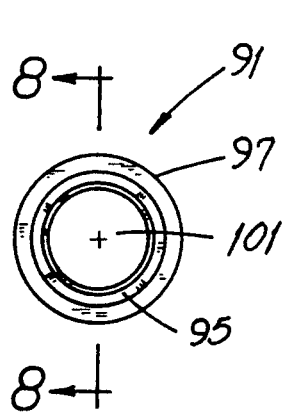
FIG. 7 is an end elevation view of a segment coupling member.
Figure 8:
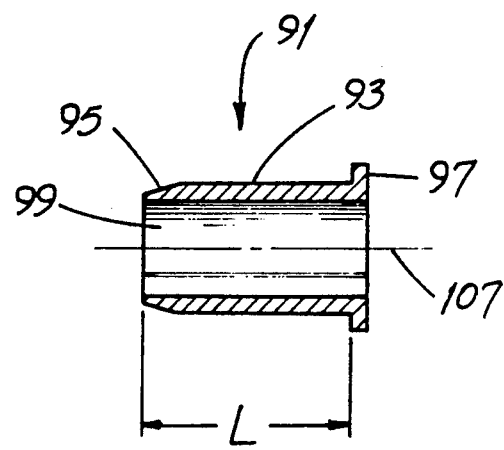
FIG. 8 is a cross-section view of the coupling member of FIG. 7 taken along the viewing plane 8—8 thereof.

Referring now to FIGS. 7 and 8, a tube-like segment coupling member 91 includes a generally cylindrical body 93, a tapered end 95, a flanged end 97, an interior surface 99 and a concentric opening 101 defined by the surface 99 and extending through the member 91. The member 91 is preferably made of hardened steel.

Figure 6:
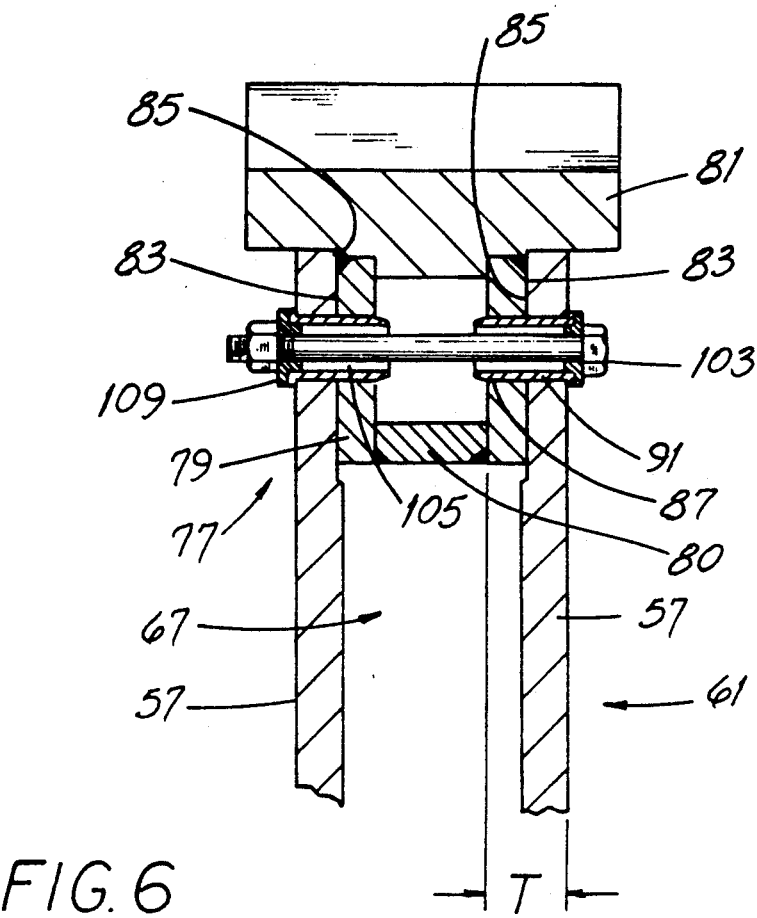
FIG. 6 is an enlarged view of a portion of the gear assembly of FIG. 5. Parts are broken away.

The diameter of the opening 101 and that of the retaining member 103 (e.g., a bolt, pin or the like) extending through it are cooperatively selected so that there is at least slight clearance and, preferably, so that there is an annular space 105 between the bolt 103 and the surface 99. Such space 105 is best seen in FIG. 6. Unlike earlier segment-web mounting arrangements using press-fit bolts, such space 105 greatly simplifies the matter of bolt removal. Each retaining member 103 is oriented generally parallel to the axis of rotation 63 of the shaft 54 and the gear assembly 55.

Each coupling member 91 extends between a web 57 and a plate 79 and each web 57 and its "companion" plate 79 have a combined thickness "T". For reasons relating to ease of removal of the coupling members 91, it is highly preferred that the body 93 of the coupling member 91 have a length "L" which is somewhat greater than the combined thickness "T".

The tapered end 95 of the coupling member 91 facilitates extension into the holes 87, 89. Of course, it is important that the coupling members 91 do not work their way further through and, possibly, out of the holes 87, 89 and fall into the space 67 between the webs 57. Therefore, a highly preferred coupling member 91 also includes a flanged end 97 which, in the exemplary embodiment, "stops" the member 91 against the web 57. While the member 91 can extend into a hole 87, 89, the flanged end prevents such coupling member from passing entirely through a hole 87, 89.

In the illustrated embodiment, each segment 71 is mounted to the spider 61 by at least one pair of coupling members 91 in axial opposed relationship to one another. In a larger gear assembly 55 like that shown, each segment 71 is attached by several pairs of coupling members 91, those of each pair being in axial opposed relationship.

A bolt 103 supported only by clamping contact with the flanged ends 97 of opposed coupling members 91 is likely to become off-center with respect to the central axes 107 of the coupling members 91 secured by it. To help avoid this eventuality as well as possible damage to the coupling members 91 by clamping a bolt 103 directly against such members 91, the bolt 103 is preferably supported generally concentric to the coupling member 91.

Referring additionally to FIGS. 9 and 10, concentric support is by at least one collar 109 interposed between the bolt 103 and the coupling member 91. Most preferably, a collar 109 is at each end of the bolt 103 between the bolt 103 and the flanged end 97 of that coupling member 91 adjacent to such bolt end.

Each collar 109 is hat-shaped in cross section, has a concentric hole 111 through it and has an enlarged shoulder 113 abutting the flanged end 97 of a coupling member 91. Such collar 109 also has an inward-projecting boss 115 having a diameter selected so that the boss 115 fits easily into the opening 101 of the coupling member 91 with slight clearance.

As described above, the segment mounting member 77 is preferably friction-fitted into the space 67 between the webs 57. It is also preferred that the outside diameter of each mounting member 77 and the diameter of the holes 89, 87 in a web 57 and a plate 87 into which the member 91 is inserted are cooperatively selected so that the members 91 must be press-fitted into the holes 87, 89. Such fitting helps avoid imposing bending forces on the member 91 and helps assure that loads imposed on the member 91 are shear loads only.

After appreciating the foregoing, the way in which the gear assembly 55 is put together will be apparent to those of ordinary skill in the art. But that is not all. The inventive assembly 55 is very easy to take apart, as well. At a field site involving, probably, difficult working conditions, such feature is more important than ease of assembly which, at least initially, may be done at the factory.

Figure 11:
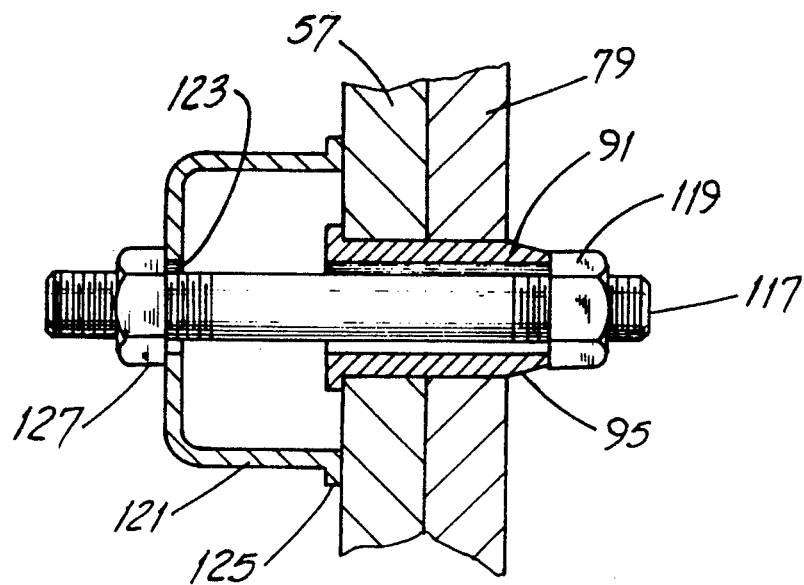
FIGS. 11 and 12 are section views showing tools used to remove a coupling member from a gear segment.

Referring to FIG. 11, to take the assembly 55 apart, the retaining member 103 is first removed from an opposed pair of coupling members 91. It is to be noted that unlike earlier press-fit bolts, the retaining members 103 slide easily from the coupling members 91. A jacking bolt 117 is then inserted through one member 91 until the inward end of such bolt 117 protrudes slightly beyond the tapered end 95. A nut 119, disc or the like is then threaded to such end.

A "U" shaped pulling bracket 121 has a hole 123 through it and the feet 125 of such bracket 121 are placed against a web 57 with the jacking bolt 117 extending through the bracket hole 123. A nut 127 is then threaded onto the bolt 117 and as the nut 127 is tightened, the coupling member 91 will be urged leftward (as seen in FIG. 11) until the nut 119 and the tapered end 95 are both flush with the plate 79. Of course, this initial stage of coupling member removal would be made much more difficult but for the fact that in its' installed position, the tapered end 95 extends somewhat beyond the plate.

Figure 12:
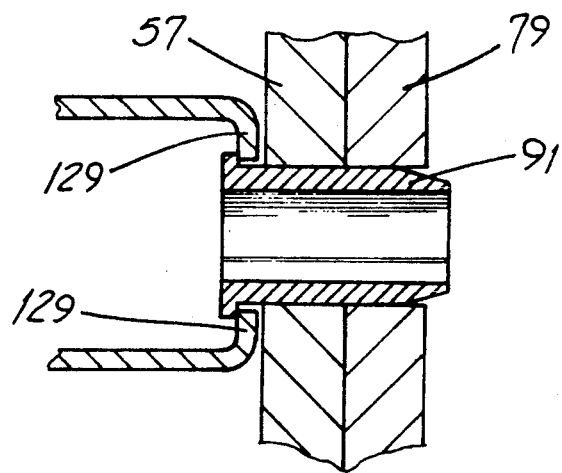

Referring to FIG. 12, once the coupling member 91 is so moved slightly outward, its flanged end 97 becomes spaced somewhat from the web 57. The gripping fingers 129 of a known type of bearing pulling tool or the like are then used to fully withdraw the member 91. Of course, the illustrated tool can be of the type in which fingers 129 can used for initial pulling as shown in FIG. 11 and then reversed for final pulling as shown in FIG. 12.

Figure 13:
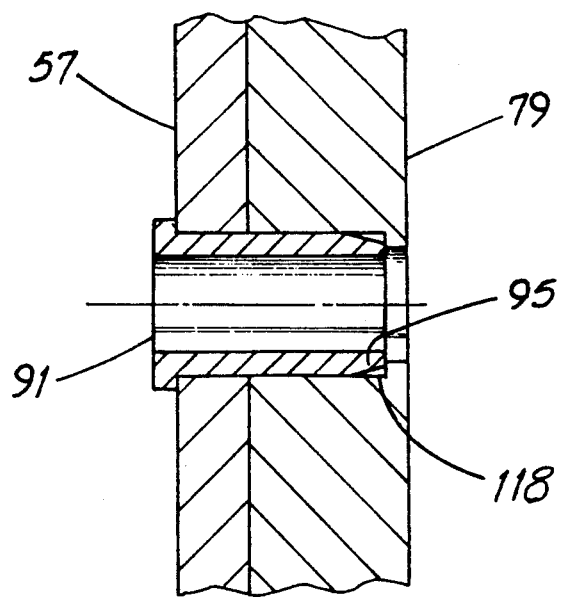
FIG. 13 is a section view, with parts broken away, showing another arrangement of a coupling member and its bore.

Other arrangements are clearly contemplated by the invention. For example, a segment mounting member 77 having plates 79 overlapping the webs 57 of the spider 61 is another such arrangement. As another example shown in FIG. 13, a support plate 79 may have a "stepped" bore 118 against which the end 95 of coupling member 91 abuts.

While the principles of this invention have been described in connection with specific embodiments, it should be understood clearly that these descriptions are made only by way of example and are not intended to limit the scope of the invention.

What is claimed is:

1. In a machine assembly having a gear segment attached to a spider, the improvement comprising:
   a pair of spaced spider webs;
   a segment-attached mounting member received between the webs, the mounting member including spaced plates;
   a segment coupling member extending between a web, the mounting member and a plate; and,
   a retaining member extending through a web and the coupling member with at least slight clearance.

2. The assembly of claim 1 wherein a web and a plate have a combined thickness and the coupling member has a length greater than the combined thickness.

3. The assembly of claim 1 including two coupling members, each coupling member extending between a separate web and a separate plate.

4. The assembly of claim 3 wherein the coupling members extend in opposite directions and each coupling member includes a flanged end preventing the coupling member from extending through the holes.

5. The assembly of claim 1 wherein the retaining member is a bolt supported generally concentric to the coupling member by at least one collar interposed between the bolt and the coupling member.

6. The assembly of claim 1 wherein each segment is mounted to the spider by at least one pair of coupling members in axial opposed relationship to one another.

7. In a machine assembly having (a) an axis of rotation nd (b) a gear segment attached to a spider, the improvement comprising:
   a pair of spaced spider webs;
   a segment-attached mounting member received between the webs;
   a segment coupling member having a generally cylindrical interior surface, the coupling member extending between a web and the mounting member;
   a bolt which is (a) generally parallel to the axis of rotation, and (b) spaced from the interior surface, the bolt extending through a web and the coupling member with at least slight clearance; and
   a collar interposed between the bolt and the coupling member and supporting the bolt generally concentric to the coupling member.

* * * * *